US010270626B2

(12) United States Patent
Chen et al.

(10) Patent No.: US 10,270,626 B2
(45) Date of Patent: Apr. 23, 2019

(54) ADAPTIVE NARROWBAND INTERFERENCE CANCELLATION METHOD, AND APPARATUS (71) Applicant: Huawei Technologies Co., Ltd., Shenzhen, Guangdong (CN)

(72) Inventors: Xi Chen, Shanghai (CN); Zhiqiang Zou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 15/466,368

(22) Filed: Mar. 22, 2017

(65) Prior Publication Data

US 2017/0195143 A1  Jul. 6, 2017

Related U.S. Application Data (63) Continuation of application No. PCT/CN2015/078532, filed on May 8, 2015.

(30) Foreign Application Priority Data

Sep. 23, 2014 (CN) .......................... 2014 1 0489628

(51) Int. Cl.
*H04L 25/03* (2006.01)
*H04B 1/10* (2006.01)
(Continued)

(52) U.S. Cl.
CPC ..... *H04L 25/03006* (2013.01); *H04B 1/1036* (2013.01); *H04L 25/03012* (2013.01);
(Continued)

(58) Field of Classification Search
CPC ............... H04L 25/022; H04L 25/0202; H04L 25/03006; H04L 25/03012; H04L 25/03159; H04L 27/265
See application file for complete search history.

(56) References Cited

U.S. PATENT DOCUMENTS 7,706,428 B2    4/2010  Wilhelmsson et al.
2006/0239367 A1* 10/2006  Wilhelmsson .... H04L 25/03006
                                                    375/260
(Continued)

FOREIGN PATENT DOCUMENTS

CN        1909383 A    2/2007
CN      101136654 A    3/2008
(Continued)

OTHER PUBLICATIONS

Kai, H, "An Improved Signal Detection Algorithm of LTE System in Interference Environment", Mar. 2014, Journal of Networks, vol. 9, p. 793-798.*

(Continued)

*Primary Examiner* — Sung Ahn (57) ABSTRACT

Embodiments of the present invention provide an adaptive narrowband interference cancellation method and an apparatus. A receiving apparatus in the present invention includes: a channel type determining module, configured to: measure a delay spread of a multipath channel passed by a received time-domain signal, and determine a channel type according to a measurement result; a weighting coefficient selection module, configured to select a weighting coefficient according to the channel type; a time-domain windowing processing module, configured to perform time-domain windowing processing on the time-domain signal according to the weighting coefficient; and a frequency-domain interference cancellation processing module, configured to perform, according to the weighting coefficient, frequency-domain interference cancellation processing on the signal that is output after the time-domain windowing processing.

18 Claims, 6 Drawing Sheets

(51) Int. Cl.
*H04L 27/26* (2006.01)
*H04L 25/02* (2006.01)

(52) U.S. Cl.
CPC .... *H04L 25/03159* (2013.01); *H04L 25/0222* (2013.01); *H04L 27/265* (2013.01)

(56) References Cited

U.S. PATENT DOCUMENTS

| | | | |
|---|---|---|---|
| 2008/0043888 A1 | 2/2008 | Bhukania et al. | |
| 2009/0161804 A1 | 6/2009 | Chrabieh et al. | |
| 2011/0150153 A1* | 6/2011 | Liu | H04L 25/03159 375/348 |
| 2011/0286497 A1* | 11/2011 | Nervig | H04L 5/0021 375/147 |
| 2014/0079103 A1 | 3/2014 | Currivan et al. | |

FOREIGN PATENT DOCUMENTS

| | | |
|---|---|---|
| CN | 101204057 A | 6/2008 |
| CN | 103368876 A | 10/2013 |
| CN | 106134517 B | 1/2014 |
| EP | 1237340 A1 | 9/2002 |
| WO | 9740608 A1 | 10/1997 |
| WO | 2006111843 A1 | 10/2006 |
| WO | 2011/134099 A1 | 11/2011 |

OTHER PUBLICATIONS

Nilsson et al.. "A Rank-Reduced LMMSE Canceller for Narrowband Interference Suppression in OFDM-Based Systems": IEEE Transactions on Communications. vol. 51, No. 12, Dec. 2003, pp. 2126-2140.

Zhang et al., "A Navel Narrowband Interference Canceller for OFDM Systems", 2004 IEEE Wireless Communications and Networking Conference (WCNC 2004), Mar. 2004, pp. 1426-1430.

Schwarz et al., "Leakage Compensation in OFDM Overlay System for VHF Aircraft Radio", Proceedings of the 10th International OFDM-Workshop (InOWo '05), Aug. 2005, pp. 240-244.

Rickard Nilsson et al., "A Narrow-Band Interference Canceller for OFDM-based Systems", Feb. 2001, 8 pages.

Arthur J. Redfem, "Receiver Window Design for Multicarrier Communication Systems", IEEE Journal on Selected Areas in Communications, vol. 20, No. 5, Jun. 2002, 8 pages.

* cited by examiner

ADAPTIVE NARROWBAND INTERFERENCE CANCELLATION METHOD, AND APPARATUS

CROSS-REFERENCE TO RELATED APPLICATIONS

This application is a continuation of International Application No. PCT/CN2015/078532, filed on May 8, 2015, which claims priority to Chinese Patent Application No. 201410489628.2, filed on Sep. 23, 2014, the disclosures of the aforementioned applications are hereby incorporated by reference in their entireties.

TECHNICAL FIELD

Embodiments of the present invention relate to the communications technologies, and in particular, to an adaptive narrowband interference cancellation method and an apparatus.

BACKGROUND

Ever-increasing requirements for communications services strain spectrum resources on a global scale, and it is difficult for operators to obtain a new spectrum or available spectrums are extremely limited. In this case, multiplexing current 2G and 3G spectrums has become an important means of competition among the operators, and is referred to as spectrum refarming in the industry. The spectrum refarming performed on communications systems of two standards inevitably causes interference to each other.

In the prior art, interference is canceled in a filtering manner. Specifically, first, a preset filter coefficient table is queried according to whether there is narrowband interference in an input signal and according to a narrowband interference feature of the narrowband interference, so as to obtain a corresponding filter coefficient. Then, a time-domain digital notch filter is configured according to the obtained filter coefficient. Finally, the narrowband interference is filtered out by using the configured time-domain digital notch filter.

However, because a passband and a stopband of a filter need to be correspondingly adjusted as system bandwidth and interference distribution change, a large quantity of preset filter coefficients need to be stored for various system bandwidth and interference distributions. The method is relatively complex, less flexible, and difficult to implement.

SUMMARY

Embodiments of the present invention provide an adaptive narrowband interference cancellation method and an apparatus, to resolve a problem that an existing narrowband interference method is relatively complex, less flexible, and difficult to implement.

According to a first aspect, an embodiment of the present invention provides a receiving apparatus, including:

a channel type determining module, configured to: measure a delay spread of a multipath channel passed by a received time-domain signal, and determine a channel type of the multipath channel according to a measurement result;

a weighting coefficient selection module, configured to select a weighting coefficient according to the channel type;

a time-domain windowing processing module, configured to perform time-domain windowing processing on the time-domain signal according to the weighting coefficient; and a frequency-domain interference cancellation processing module, configured to perform, according to the weighting coefficient, frequency-domain interference cancellation processing on the signal that is output after the time-domain windowing processing, so as to cancel narrowband interference of the time-domain signal.

With reference to the first aspect, in a first possible implementation manner of the first aspect, the channel type determining module is configured to: measure the delay spread of the multipath channel passed by the time-domain signal, to obtain a measured delay spread value; and determine the channel type according to a result of comparison between the measured delay spread value and a preset delay spread value.

With reference to the first possible implementation manner of the first aspect, in a second possible implementation manner of the first aspect, the channel type determining module is configured to determine whether the measured delay spread value is less than a first preset delay spread value; and if the measured delay spread value is less than the first preset delay spread value, the channel type is an extended pedestrian model A EPA; or if the measured delay spread value is greater than or equal to the first preset delay spread value, and the measured delay spread value is less than the second preset delay spread value, the channel type is an extended vehicular model A EVA; or if the measured delay spread value is greater than or equal to the first preset delay spread value, and the measured delay spread value is greater than or equal to the second preset delay spread value, the channel type is an extended typical urban model ETU.

With reference to any one of the first aspect, or the first to the second possible implementation manners of the first aspect, in a third possible implementation manner of the first aspect, the weighting coefficient selection module is configured to select the weighting coefficient that matches the channel type from a preset channel parameter configuration table according to the channel type, where the weighting coefficient includes a time-domain window length, a time-domain windowing coefficient, a maximum quantity of interference cancellation subcarriers, and an interference estimation weighting coefficient.

With reference to the third possible implementation manner of the first aspect, in a fourth implementation manner of the first aspect, the time-domain windowing processing module is configured to perform the time-domain windowing processing on the time-domain signal according to the time-domain window length and the time-domain windowing coefficient, where the time-domain windowing processing includes windowing processing and cyclic prefix CP combination processing.

With reference to the third or the fourth possible implementation manner of the first aspect, in a fifth possible implementation manner of the first aspect, the apparatus further includes:

a fast Fourier transformation FFT module, configured to perform FFT on the signal on which the time-domain windowing processing has been performed, to obtain a frequency-domain signal.

With reference to the fifth possible implementation manner of the first aspect, in a sixth possible implementation manner of the first aspect, the frequency-domain interference cancellation processing module includes:

a narrowband interference power calculation unit, configured to: determine a center frequency location of the narrowband interference, and calculate narrowband interference power according to the center frequency location and the frequency-domain signal; and an interference cancellation unit, configured to: determine, according to the maximum quantity of interference cancellation subcarriers and the narrowband interference power, a quantity of subcarriers on which interference needs to be canceled; calculate, according to the weighting coefficient and the quantity of subcarriers on which interference needs to be canceled, interference on the subcarrier on which interference needs to be canceled; and cancel the interference according to the interference on the subcarrier on which interference needs to be canceled and the frequency-domain signal that is corresponding to the subcarrier on which interference needs to be canceled, so as to cancel the narrowband interference of the time-domain signal.

With reference to the sixth possible implementation manner of the first aspect, in a seventh possible implementation manner of the first aspect, the narrowband interference power calculation unit is configured to accumulate, by using the center frequency location as a center, power of frequency-domain signals that are corresponding to Q subcarriers, to obtain the narrowband interference power, where Q is determined by narrowband interference bandwidth and a subcarrier interval, and Q is a natural number.

With reference to the sixth or the seventh possible implementation manner of the first aspect, in an eighth possible implementation manner of the first aspect, the interference cancellation unit is configured to: search a preset subcarrier quantity mapping table for a power level that matches the narrowband interference power, and determine, according to the power level and the maximum quantity of interference cancellation subcarriers, the quantity of subcarriers on which interference needs to be canceled.

With reference to any one of the sixth to the eighth possible implementation manners of the first aspect, in a ninth possible implementation manner of the first aspect, the interference cancellation unit is configured to: select M subcarriers as observation samples by using the center frequency location as a center, and calculate, according to the observation samples, the weighting coefficient, and the quantity of subcarriers on which interference needs to be canceled, the interference on the subcarrier on which interference needs to be canceled, where M is a natural number.

With reference to any one of the sixth to the ninth possible implementation manners of the first aspect, in a tenth possible implementation manner of the first aspect, the narrowband interference power calculation unit is configured to determine the center frequency location according to control signaling.

With reference to any one of the sixth to the ninth possible implementation manners of the first aspect, in an eleventh possible implementation manner of the first aspect, the apparatus further includes:

an interference frequency search module, configured to determine the center frequency location by traversing all subcarriers corresponding to the frequency-domain signal.

According to a second aspect, an embodiment of the present invention provides an adaptive narrowband interference suppression method, including:

measuring a delay spread of a multipath channel passed by a received time-domain signal, and determining a channel type of the multipath channel according to a measurement result;

selecting a weighting coefficient according to the channel type;

performing time-domain windowing processing on the time-domain signal according to the weighting coefficient; and performing, according to the weighting coefficient, frequency-domain interference cancellation processing on the signal that is output after the time-domain windowing processing, so as to cancel narrowband interference of the time-domain signal.

With reference to the second aspect, in a first possible implementation manner of the second aspect, the measuring a delay spread of a multipath channel passed by a received time-domain signal, and determining a channel type according to a measurement result includes:

measuring the delay spread of the multipath channel passed by the time-domain signal, to obtain a measured delay spread value; and determining the channel type according to a result of comparison between the measured delay spread value and a preset delay spread value.

With reference to the first possible implementation manner of the second aspect, in a second possible implementation manner of the second aspect, the determining the channel type according to a result of comparison between the measured delay spread value and a preset delay spread value includes:

determining whether the measured delay spread value is less than a first preset delay spread value; and if the measured delay spread value is less than the first preset delay spread value, the channel type is an extended pedestrian model A EPA; or if the measured delay spread value is greater than or equal to the first preset delay spread value, and the measured delay spread value is less than the second preset delay spread value, the channel type is an extended vehicular model A EVA; or if the measured delay spread value is greater than or equal to the first preset delay spread value, and the measured delay spread value is greater than or equal to the second preset delay spread value, the channel type is an extended typical urban model ETU.

With reference to anyone of the second aspect, or the first to the second possible implementation manners of the second aspect, in a third possible implementation manner of the second aspect, the selecting a weighting coefficient according to the channel type includes:

selecting the weighting coefficient that matches the channel type from a preset channel parameter configuration table according to the channel type, where the weighting coefficient includes a time-domain window length, a time-domain windowing coefficient, a maximum quantity of interference cancellation subcarriers, and an interference estimation weighting coefficient.

With reference to the third possible implementation manner of the second aspect, in a fourth possible implementation manner of the second aspect, the performing time-domain windowing processing on the time-domain signal according to the weighting coefficient includes:

performing the time-domain windowing processing on the time-domain signal according to the time-domain window length and the time-domain windowing coefficient, where the time-domain windowing processing includes windowing processing and cyclic prefix CP combination processing.

With reference to the third or the fourth possible implementation manner of the second aspect, in a fifth possible implementation manner of the second aspect, before the performing, according to the weighting coefficient, frequency-domain interference cancellation processing on the signal that is output after the time-domain windowing processing, so as to cancel narrowband interference of the time-domain signal, the method further includes:

performing faster Fourier transformation FFT on the signal on which the time-domain windowing processing has been performed, to obtain a frequency-domain signal.

With reference to the fifth possible implementation manner of the second aspect, in a sixth possible implementation manner of the second aspect, the performing, according to the weighting coefficient, frequency-domain interference cancellation processing on the signal that is output after the time-domain windowing processing, so as to cancel narrowband interference of the time-domain signal further includes:

determining a center frequency location of the narrowband interference;

calculating narrowband interference power according to the center frequency location and the frequency-domain signal;

determining, according to the maximum quantity of interference cancellation subcarriers and the narrowband interference power, a quantity of subcarriers on which interference needs to be canceled;

calculating, according to the weighting coefficient and the quantity of subcarriers on which interference needs to be canceled, interference on the subcarrier on which interference needs to be canceled; and canceling the interference according to the interference on the subcarrier on which interference needs to be canceled and the frequency-domain signal that is corresponding to the subcarrier on which interference needs to be canceled, so as to cancel the narrowband interference of the time-domain signal.

With reference to the sixth possible implementation manner of the second aspect, in a seventh possible implementation manner of the second aspect, the calculating narrowband interference power according to the center frequency location and the frequency-domain signal includes:

accumulating, by using the center frequency location as a center, power of frequency-domain signals that are corresponding to Q subcarriers, to obtain the narrowband interference power, where Q is determined by narrowband interference bandwidth and a subcarrier interval, and Q is a natural number.

With reference to the sixth or the seventh possible implementation manner of the second aspect, in an eighth possible implementation manner of the second aspect, the determining, according to the maximum quantity of interference cancellation subcarriers and the narrowband interference power, a quantity of subcarriers on which interference needs to be canceled includes:

searching a preset subcarrier quantity mapping table for a power level that matches the narrowband interference power, and determining, according to the power level and the maximum quantity of interference cancellation subcarriers, the quantity of subcarriers on which interference needs to be canceled.

With reference to any one of the sixth to the eighth possible implementation manners of the second aspect, in a ninth possible implementation manner of the second aspect, the calculating, according to the weighting coefficient and the quantity of subcarriers on which interference needs to be canceled, interference on the subcarrier on which interference needs to be canceled includes:

selecting M subcarriers as observation samples by using the center frequency location as a center, and calculating, according to the observation samples, the weighting coefficient, and the quantity of subcarriers on which interference needs to be canceled, the interference on the subcarrier on which interference needs to be canceled, where M is a natural number.

With reference to any one of the sixth to the ninth possible implementation manners of the second aspect, in a tenth possible implementation manner of the second aspect, the determining a center frequency location of the narrowband interference includes:

determining the center frequency location according to control signaling.

With reference to any one of the sixth to the ninth possible implementation manners of the second aspect, in an eleventh possible implementation manner of the second aspect, the determining a center frequency location of the narrowband interference includes:

determining the center frequency location by traversing all subcarriers corresponding to the frequency-domain signal.

According to the adaptive narrowband interference cancellation method and the apparatus in the embodiments of the present invention, narrowband interference intensity is detected in real time, and a related weighting coefficient for interference cancellation is selected according to the narrowband interference intensity, so that time-domain windowing processing and frequency-domain interference cancellation processing are performed on a received signal, to resolve a problem that an existing narrowband interference method is relatively complex, less flexible, and difficult to implement.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
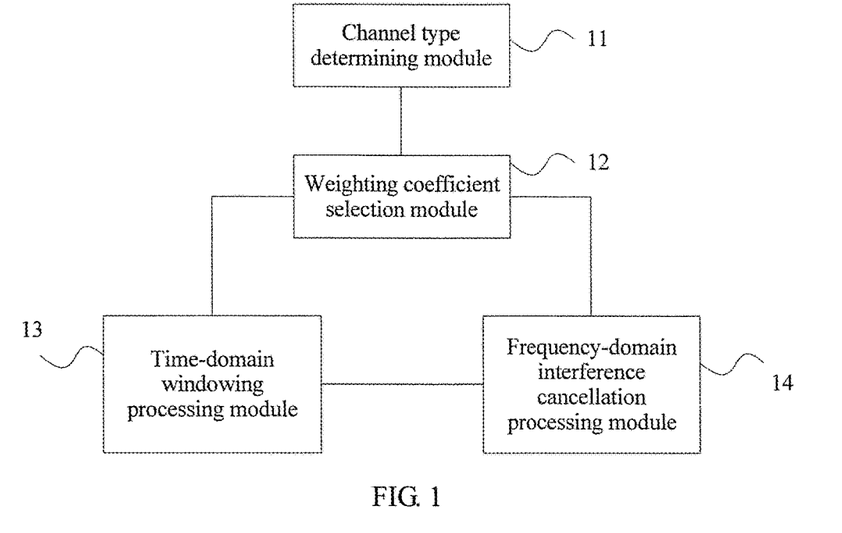
FIG. 1 is a schematic structural diagram of an embodiment of a receiving apparatus according to the present invention.

FIG. 1 is a schematic structural diagram of an embodiment of a receiving apparatus according to the present invention. As shown in FIG. 1, the apparatus in this embodiment may include: a channel type determining module 11, a weighting coefficient selection module 12, a time-domain windowing processing module 13, and a frequency-domain interference cancellation processing module 14. The channel type determining module 11 is configured to: measure a delay spread of a multipath channel passed by a received time-domain signal, and determine a channel type of the multipath channel according to a measurement result. The weighting coefficient selection module 12 is configured to select a weighting coefficient according to the channel type. The time-domain windowing processing module 13 is configured to perform time-domain windowing processing on the time-domain signal according to the weighting coefficient. The frequency-domain interference cancellation processing module 14 is configured to perform, according to the weighting coefficient, frequency-domain interference cancellation processing on the signal that is output after the time-domain windowing processing, so as to cancel narrowband interference of the time-domain signal.

In the present invention, the channel type determining module 11 of the receiving apparatus measures the delay spread of the received signal according to the received signal and a base station sends a pulse signal. The received signal includes not only the pulse signal but also a delay signal. Such a phenomenon of pulse width extension of a received signal due to a multipath effect is referred to as a delay spread, and the delay spread is a difference between a maximum transmission delay and a minimum transmission delay on a multipath channel. Then, the channel type determining module 11 determines a radio channel type according to a measurement result. For example, in LTE, the channel type includes an extended pedestrian model A (EPA), an extended vehicular model A (EVA), and an extended typical urban (ETU), and each channel type is corresponding to a different delay spread. The weighting coefficient selection module 12 adaptively selects different weighting coefficients according to the channel type, and the weighting coefficient herein is a related coefficient that is corresponding to the channel type and that is required for signal interference processing. An optimal time-domain window length is adaptively selected according to the channel type, so that a best narrowband interference suppression effect can be achieved without introducing intersymbol interference (ISI). The time-domain windowing processing module 13 cancels the interference processing on a received signal in a time domain before fast Fourier transformation (FFT) is performed on the received signal. Windowing and cyclic prefix (CP) combination are performed on the received signal, so that sidelobe leakage of the narrowband interference is reduced to suppress the interference. After the FFT is performed on the received signal, the frequency-domain interference cancellation processing module 14 performs, according to the weighting coefficient, the frequency-domain interference cancellation processing on the signal output by the time-domain windowing processing module 13. That is, total power of subcarriers near an interference frequency is calculated according to an interference frequency location that is delivered by a higher layer or detected; then, narrowband interference intensity is estimated; unmodulated subcarriers near the interference frequency are selected as observation samples, and weighted accumulation is performed on the observation samples by using the weighting coefficient to reconstruct interference that is formed after the narrowband interference is leaked to a location of a modulated subcarrier near the interference frequency; finally, the interference is canceled. Because the receiving apparatus cancels interference on only some subcarriers on a main lobe and a near-end sidelobe of the interference, and does not need to process all bandwidth, so that complexity and power consumption of interference cancellation are significantly reduced.

According to the apparatus in the present invention, narrowband interference intensity is detected in real time, and a related weighting coefficient for interference cancellation is selected according to the narrowband interference intensity, so that time-domain windowing processing and frequency-domain interference cancellation processing are performed on a received signal, to resolve a problem that an existing narrowband interference method is relatively complex, less flexible, and difficult to implement.

Figure 2:
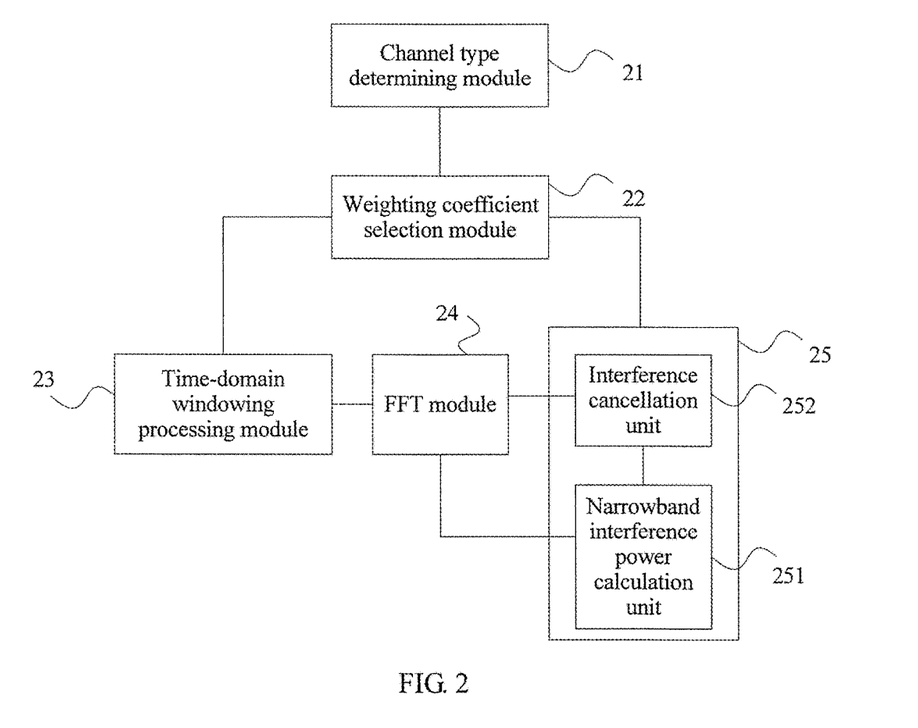
FIG. 2 is a schematic structural diagram of another embodiment of a receiving apparatus according to the present invention.

FIG. 2 is a schematic structural diagram of another embodiment of a receiving apparatus according to the present invention. As shown in FIG. 2, the apparatus in this embodiment may include: a channel type determining module 21, a weighting coefficient selection module 22, a time-domain windowing processing module 23, an FFT module 24, and a frequency-domain interference cancellation processing module 25. The frequency-domain interference cancellation processing module 25 may further include a narrowband interference power calculation unit 251 and an interference cancellation unit 252.

The channel type determining module 21 measures a delay spread of a multipath channel passed by a time-domain signal, to obtain a measured delay spread value, and determines a channel type according to a result of comparison between the measured delay spread value and a preset delay spread value.

Figure 3:
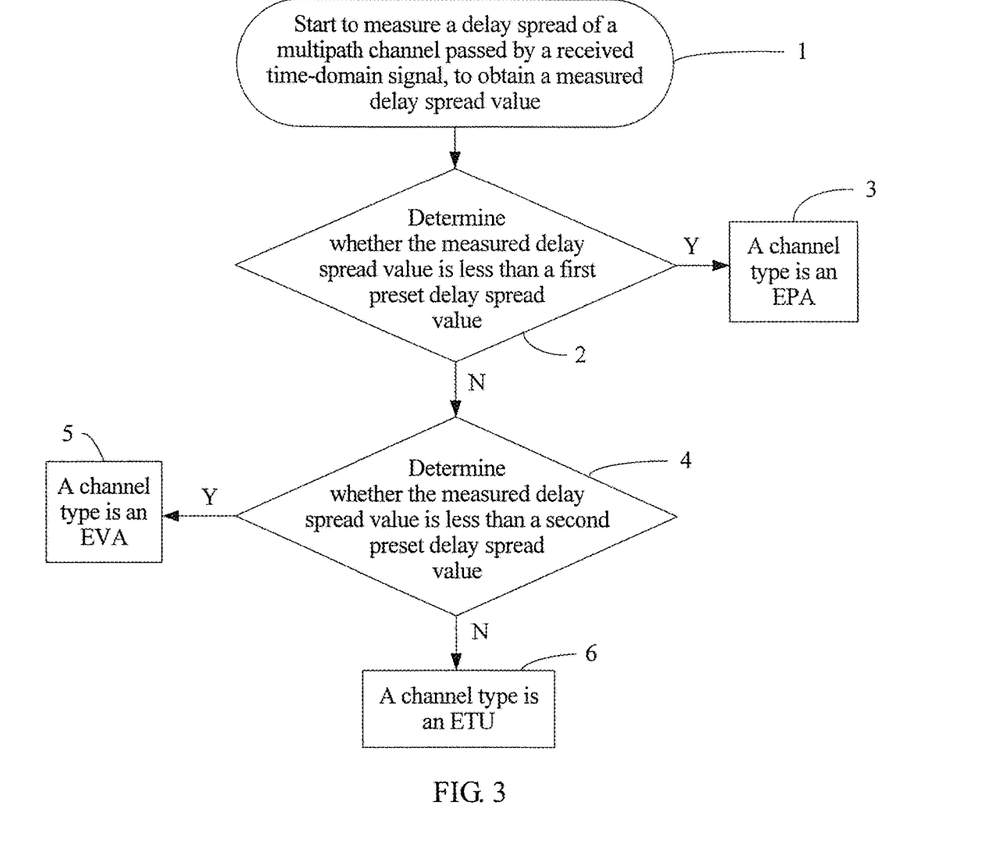
FIG. 3 is a schematic flowchart of determining a channel type.

Spectrum multiplexing of two standards: Global System for Mobile Communications (GSM) and Long Term Evolution (LTE) is used as an example, and narrowband interference in a GSM system is canceled in an LTE system. FIG. 3 is a schematic flowchart of determining a channel type. As shown in FIG. 3, the channel type determining module 21 starts to: measure a delay spread of a multipath channel passed by a received time-domain signal, to obtain a measured delay spread value (step 1); determine whether the measured delay spread value is less than a first preset delay spread value (step 2); and if the measured delay spread value is less than the first preset delay spread value, the channel type is an EPA (step 3); or if the measured delay spread value is greater than or equal to the first preset delay spread value, determine whether the measured delay spread value is less than a second preset delay spread value (step 4); and if the measured delay spread value is greater than or equal to the first preset delay spread value, and the measured delay spread value is less than the second preset delay spread value, the channel type is an EVA (step 5); or if the measured delay spread value is greater than or equal to the first preset delay spread value, and the measured delay spread value is greater than or equal to the second preset delay spread value, the channel type is an ETU (step 6). That the first preset delay spread value is less than the second delay spread value preset value may be set according to an actual requirement, or may be set according to systems of two standards for spectrum multiplexing. This is not limited herein.

After the channel type is determined, the weighting coefficient selection module 22 selects a weighting coefficient that matches the channel type from a preset channel parameter configuration table according to the channel type, where the weighting coefficient includes a time-domain window length, a time-domain windowing coefficient, a maximum quantity of interference cancellation subcarriers, and an interference estimation weighting coefficient.

Specifically, a relationship between the channel type and the time-domain window length W is: a larger delay spread corresponding to a channel type indicates a smaller selected time-domain window length W, and a smaller delay spread corresponding to a channel type indicates a larger selected time-domain window length W. A relationship between the channel type and the maximum quantity $K_{max}$ of interference cancellation subcarriers is: a larger delay spread corresponding to a channel type indicates a larger selected $K_{max}$, and a smaller delay spread corresponding to a channel type indicates a smaller selected $K_{max}$. Table 1 is an example of the preset channel parameter configuration table. The weighting coefficient selection module 22 selects the weighting coefficient that matches the channel type from Table 1 according to the channel type. In Table 1, the time-domain window length $W_3<W_2<W_1<P$, P is a CP length, and the maximum quantity of interference cancellation subcarriers $K_{1max}<K_{2max}<K_{3max}$. If the determined channel type is an EPA channel, in the weighting coefficient, the time-domain window length $W=W_1$, the time-domain windowing coefficient $w(n)=w_1(n)$, the maximum quantity of interference cancellation subcarriers $K_{max}=K_{1max}$, and the interference estimation weighting coefficient $H(i, j)=H_1(i, j)$, where $0 \leq i < K_{1max}$, and $0 \leq j < M$. If the determined channel type an EVA channel, in the weighting coefficient, the time-domain window length $W=W_2$, the time-domain windowing coefficient $w(n)=w_2(n)$, the maximum quantity of interference cancellation subcarriers $K_{max}=K_{2max}$, and the interference estimation weighting coefficient $H(i, j)=H_2(i, j)$, where $0 \leq i < K_{2max}$, and $0 \leq j < M$. If the determined channel type is an ETU channel, in the weighting coefficient, the time-domain window length $W=W_3$, the time-domain windowing coefficient $w(n)=w_3(n)$, the maximum quantity of interference cancellation subcarriers $K_{max}=K_{3max}$, and the interference estimation weighting coefficient $H(i, j)=H_3(i, j)$, where $0 \leq i < K_{3max}$, and $0 \leq j < M$. M is a quantity of selected observation samples.

The FFT module 24 performs FFT on the signal on which the time-domain windowing processing has been performed, to obtain a frequency-domain signal. After the FFT is performed on the signal z(n), where n=0, . . . , N−1, a frequency-domain signal $$Z(k) = \frac{1}{\sqrt{N}} \sum_{n=0}^{N-1} z(n) e^{-j(2\pi/N)kn}$$

of an $n^{th}$ sample is obtained, where k=0, . . . , N−1.

The narrowband interference power calculation unit 251 determines a center frequency location of narrowband interference, and calculates narrowband interference power according to the center frequency location and the frequency-domain signal. The interference cancellation unit 252 determines, according to the maximum quantity of interference cancellation subcarriers and the narrowband interference power, a quantity of subcarriers on which interference needs to be canceled; calculates, according to the weighting coefficient and the quantity of subcarriers on which interference needs to be canceled, interference on the subcarrier on which interference needs to be canceled; and cancels the interference according to the interference on the subcarrier on which interference needs to be canceled and the frequency-domain signal that is corresponding to the subcarrier on which interference needs to be canceled, so as to cancel the narrowband interference of the time-domain signal.

Specifically, the narrowband interference power calculation unit 251 accumulates, by using the center frequency location as a center, power of frequency-domain signals that are corresponding to Q subcarriers, to obtain the narrowband interference power. Q is determined by narrowband interference bandwidth and a subcarrier interval, and Q is a natural number. The interference cancellation unit 252 searches a preset subcarrier quantity mapping table for a power level that matches the narrowband interference power, and determines, according to the power level and the maximum quantity of interference cancellation subcarriers,

TABLE 1

| CHANNEL TYPE | TIME-DOMAIN WINDOW LENGTH W | TIME-DOMAIN WINDOWING COEFFICIENT W(N) | MAXIMUM QUANTITY K OF INTERFERENCE CANCELLATION SUBCARRIERS | INTERFERENCE ESTIMATION WEIGHTING COEFFICIENT H(I, J) |
|---|---|---|---|---|
| EPA | $W_1$ | $W_1$ (N) | $K_{1MAX}$ | $H_1$ (I, J) |
| EVA | $W_2$ | $W_2$ (N) | $K_{2MAX}$ | $H_2$ (I, J) |
| ETU | $W_3$ | $W_3$ (N) | $K_{3MAX}$ | $H_3$ (I, J) |

The time-domain windowing processing module 23 performs time-domain windowing processing on the time-domain signal according to the time-domain window length and the time-domain windowing coefficient, where the time-domain windowing processing includes windowing processing and cyclic prefix CP combination processing.

It is assumed that the received signal is y(n), where n=0, . . . , N+P−1, P is the CP length, and N is a quantity of FFT points. The signal processed by the time-domain windowing processing module 23 is z(n), where n=0, . . . , N−1. First N−W samples of z(n) are z(n)=y (n+p), where n=0, . . . , N−W−1, and last W samples are z(n)=w(n+W−N)×y(n+P−N)+(1−w(n+W−N))×y(n+P), where n=N−W, . . . , N−1.

the quantity of subcarriers on which interference needs to be canceled; selects M subcarriers as observation samples by using the center frequency location as a center, and calculates, according to the observation samples, the interference estimation weighting coefficient, and the quantity of subcarriers on which interference needs to be canceled, the interference on the subcarrier on which interference needs to be canceled, where M is a natural number; and cancels the interference according to the interference on the subcarrier on which interference needs to be canceled and the frequency-domain signal that is corresponding to the subcarrier on which interference needs to be canceled, so as to cancel the narrowband interference of the time-domain signal.

The narrowband interference power calculation unit 251 determines, according to control signaling of a higher layer, a subcarrier sequence number corresponding to the center frequency location is $n_c$. For example, in a scenario of spectrum multiplexing of GSM and LTE, the receiving apparatus obtains an uplink occupied frequency of a current GSM system from a BSC, and obtains the subcarrier location $n_c$ in LTE, corresponding to the uplink occupied frequency by means of calculation. The narrowband interference power calculation unit 251 calculates a sum of power of frequency-domain signals corresponding to Q/2 subcarriers selected leftwards by using the $n_c$ as a center and frequency-domain signals corresponding to Q/2 subcarriers selected rightwards by using the $n_c$ as a center. That is, the narrowband interference power $$P_{Interf}(n_c) = \sum_{k=n_c-Q/2}^{n_c+Q/2-1} |Z(k)|^2,$$

and in the scenario of the spectrum multiplexing of GSM and LTE, Q=200 kHz/15 kHz≈13. Table 2 is an example of the preset subcarrier quantity mapping table. The interference cancellation unit 252 first initializes an output signal ZIC(k)=Z(k), where k=0, ..., N−1, determines the matched power level according to the narrowband interference power $P_{interf}(n_c)$ by searching Table 2, and then, determines the quantity K of subcarriers on which interference needs to be canceled. As shown in Table 2, D+1 power levels are determined according to values of the narrowband interference power, different power levels are corresponding to different quantities K of subcarriers on which interference needs to be canceled, and a relationship between a value of K and the narrowband interference power $P_{interf}(n_c)$ is: a larger $P_{interf}(n_c)$ indicates a larger quantity K of subcarriers on which interference needs to be canceled, and a smaller $P_{interf}(n_c)$ indicates a smaller quantity K of subcarriers on which interference needs to be canceled. During interference cancellation, only interference on K subcarriers near the narrowband interference is canceled, and interference on remaining subcarriers is not canceled. Then, the interference cancellation unit 252 respectively selects M/2 subcarriers leftwards and rightwards as observation samples by using the center frequency location $n_c$ of the narrowband interference as a center, and calculates, according to the M observation samples, the weighting coefficient, and the quantity K of subcarriers on which interference needs to be canceled, the interference on the subcarrier on which interference needs to be canceled, where the interference is $$I(k) = \sum_{n=-M/2}^{M/2-1} H(K_{max}/2 - n_c + k, M/2 + n)Z(n_c + n),$$

and k=$n_c$−K/2, ..., $n_c$+K/2−1. The interference cancellation unit 252 finally cancels the interference in a corresponding sample location, where ZIC(k)=ZIC(k)−I(k), and k=$n_c$−K/2, ..., $n_c$+K/2−1. During interference cancellation, only interference on the quantity K subcarriers on which interference needs to be canceled, and interference on remaining subcarriers is not canceled.

TABLE 2

| NARROWBAND INTERFERENCE POWER $P_{INTERF}$ ($N_C$) | QUANTITY K OF SUBCARRIERS ON WHICH INTERFERENCE NEEDS TO BE CANCELLED |
|---|---|
| <$P_1$ | 0 |
| [$P_1$, $P_2$) | $K_{MAX}$/D |
| [$P_2$, $P_3$) | 2$K_{MAX}$/D |
| ... | ... |
| [$P_{D-1}$, $P_D$) | (D − 1)$K_{MAX}$/D |
| ≥$P_D$ | $K_{MAX}$ |

It should be noted that if there are multiple pieces of narrowband interference in a bandwidth range of the received signal, the foregoing process is repeated for each piece of narrowband interference until all interference is canceled.

According to the apparatus in the present invention, narrowband interference intensity is detected in real time, and a related weighting coefficient for interference cancellation is selected according to the narrowband interference intensity, so that time-domain windowing processing and frequency-domain interference cancellation processing are performed on a received signal, to resolve a problem that an existing narrowband interference method is relatively complex, less flexible, and difficult to implement.

Figure 4:
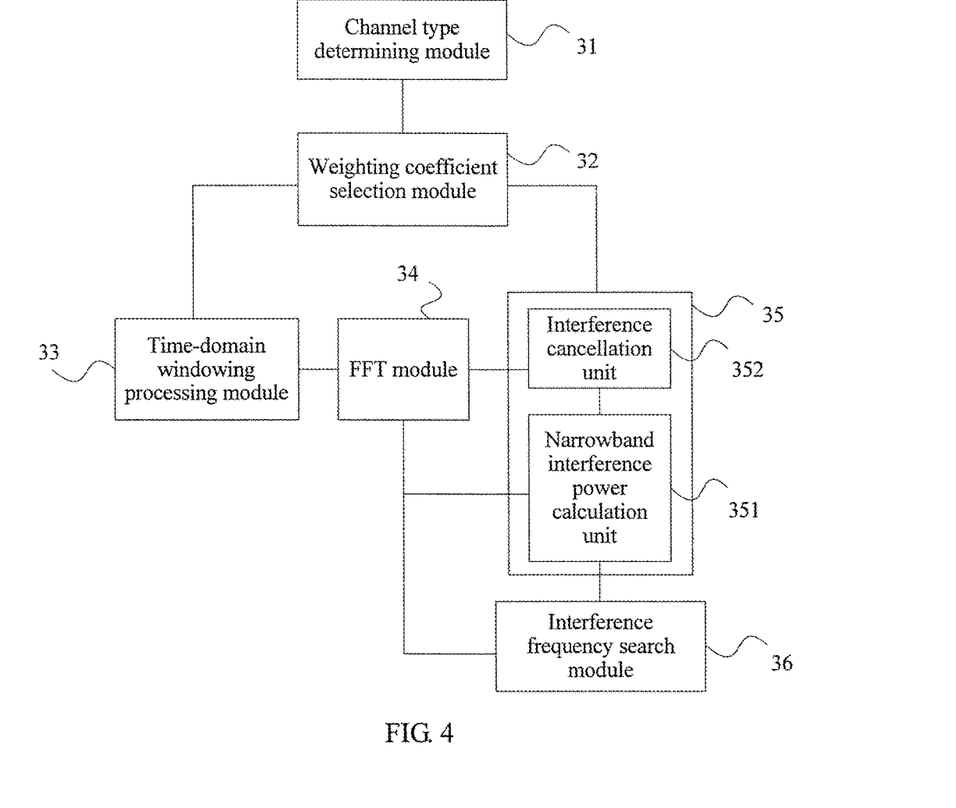
FIG. 4 is a schematic structural diagram of still another embodiment of a receiving apparatus according to the present invention.

FIG. 4 is a schematic structural diagram of still another embodiment of a receiving apparatus according to the present invention. As shown in FIG. 4, the apparatus in this embodiment may include: a channel type determining module 31, a weighting coefficient selection module 32, a time-domain windowing processing module 33, an FFT module 34, a frequency-domain interference cancellation processing module 35, and an interference frequency searching module 36. The frequency-domain interference cancellation processing module 35 may further include a narrowband interference power calculation unit 351 and an interference cancellation unit 352.

This embodiment differs from the embodiment shown in FIG. 2 in that a center frequency location of narrowband interference is not indicated by a higher layer by using control signaling, but is found by the interference frequency searching module 36. The interference frequency searching module 36 determines the center frequency location by traversing all subcarriers corresponding to frequency-domain signals. This may be completed by using any prior art such as a peak search technology or a threshold decision technology. Further, before interference frequency search, frequency-domain or time-domain smooth filtering may be further performed on a mode of each subcarrier to reduce noise impact. Therefore, accuracy of a search result is improved. Then, a narrowband interference situation is detected according to a specified threshold. If a narrowband interference value is greater than the threshold, there is narrowband interference; if a narrowband interference value is less than or equal to the threshold, there is no narrowband interference, and an intermediate point of data points between two points at which the threshold and a frequency spectrum signal intersect is used as the center frequency location $n_c$. To reduce a search range and search complexity, some prior information may be used. Spectrum multiplexing of GSM and LTE is used as an example. Because a frequency location and a frequency interval (generally a minimum interval is 200 kHz) of the GSM are relatively fixed, search may be performed at an interval of 200 kHz during interference frequency search. Therefore, the search range and the search complexity are significantly reduced.

Figure 5:
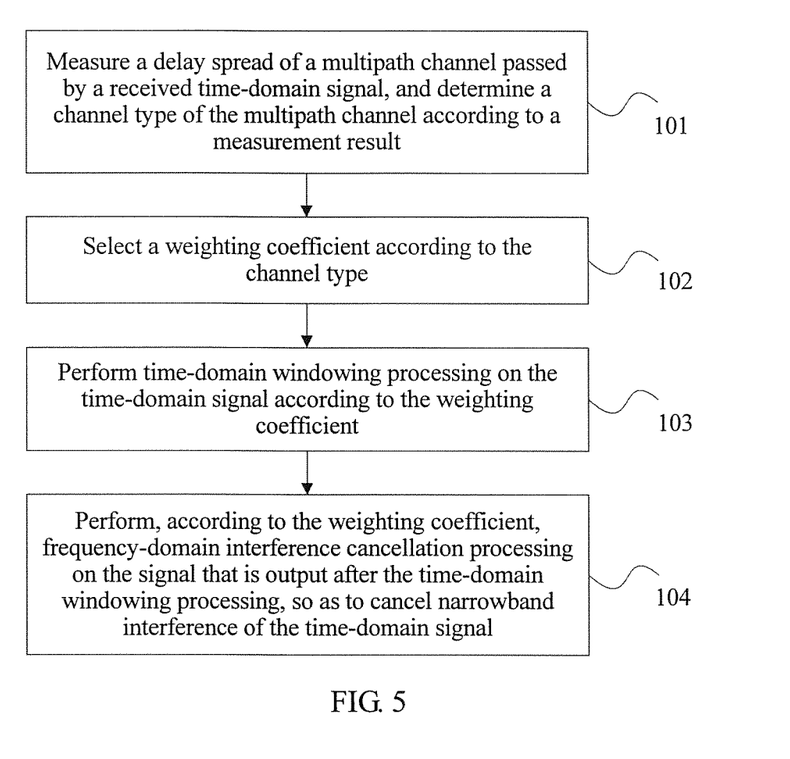
FIG. 5 is a flowchart of an embodiment of an adaptive narrowband interference suppression method according to the present invention.

FIG. 5 is a flowchart of an embodiment of an adaptive narrowband interference suppression method according to the present invention. As shown in FIG. 5, the method in this embodiment may include the following steps.

Step 101: Measure a delay spread of a multipath channel passed by a received time-domain signal, and determine a channel type of the multipath channel according to a measurement result.

This embodiment may be performed by a receiving apparatus that is applicable to OFDM, and the receiving apparatus may use an apparatus structure shown in any apparatus embodiment in FIG. 1, FIG. 2, or FIG. 4. A signal received by the receiving apparatus is a time-domain signal, the delay spread of the multipath channel passed by the time-domain signal is measured, and the channel type of the multipath channel is determined.

Step 102: Select a weighting coefficient according to the channel type.

The weighting coefficient is a related coefficient that is corresponding to the channel type and that is required for signal interference processing. The receiving apparatus adaptively selects an optimal time-domain window length according to the channel type, so that a best narrowband interference suppression effect can be achieved without introducing ISI.

Step 103: Perform time-domain windowing processing on the time-domain signal according to the weighting coefficient.

The time-domain windowing processing is interference cancellation processing performed on a received signal in a time domain by the receiving apparatus before FFT is performed on the received signal. Windowing and CP combination are performed on the received signal, so that sidelobe leakage of narrowband interference is reduced to suppress the interference.

Step 104: Perform, according to the weighting coefficient, frequency-domain interference cancellation processing on the signal that is output after the time-domain windowing processing, so as to cancel narrowband interference of the time-domain signal.

After performing the FFT on the received signal, the receiving apparatus performs, according to the weighting coefficient, the frequency-domain interference cancellation processing on the signal that is output after the time-domain windowing processing. That is, total power of subcarriers near an interference frequency is calculated according to an interference frequency location that is delivered by a higher layer or detected; then, narrowband interference intensity is estimated; unmodulated subcarriers near the interference frequency are selected as observation samples, and weighted accumulation is performed on the observation samples by using the weighting coefficient to reconstruct interference that is formed after the narrowband interference is leaked to a location of a modulated subcarrier near the interference frequency; finally, the interference is canceled. Because the receiving apparatus cancels interference on only some subcarriers on a main lobe and a near-end sidelobe of the interference, and does not need to process all bandwidth, so that complexity and power consumption of interference cancellation are significantly reduced.

In this embodiment, narrowband interference intensity is detected in real time, and a related weighting coefficient for interference cancellation is selected according to the narrowband interference intensity, so that time-domain windowing processing and frequency-domain interference cancellation processing are performed on a received signal, to resolve a problem that an existing narrowband interference method is relatively complex, less flexible, and difficult to implement.

Figure 6A:
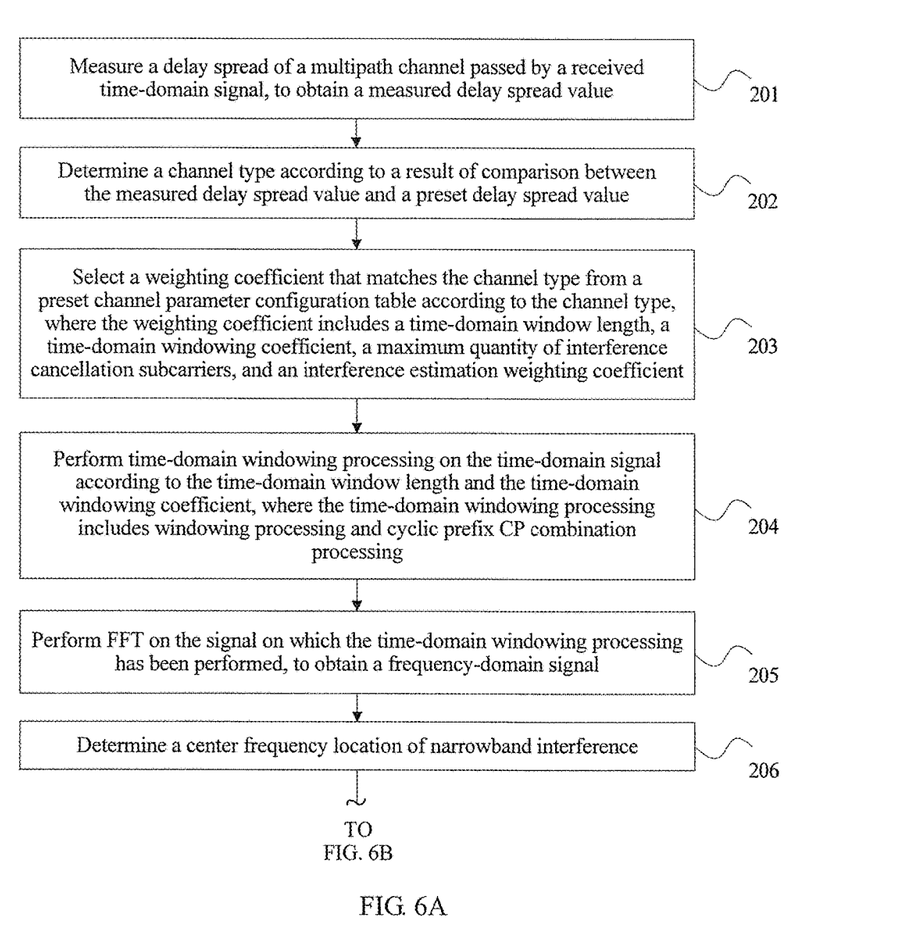
FIG. 6A and FIG. 6B are a flowchart of another embodiment of an adaptive narrowband interference suppression method according to the present invention.
Figure 6B:
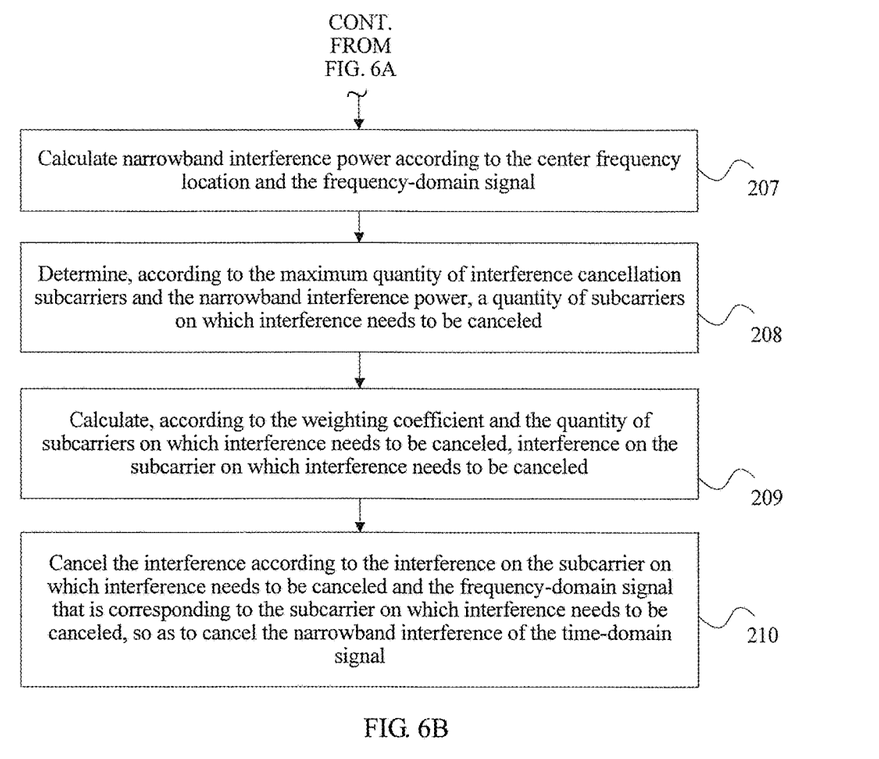

FIG. 6A and FIG. 6B are a flowchart of another embodiment of an adaptive narrowband interference suppression method according to the present invention. As shown in FIG. 6A and FIG. 6B, the method in this embodiment may include the following steps.

Step 201: Measure a delay spread of a multipath channel passed by a received time-domain signal, to obtain a measured delay spread value.

This embodiment may be performed by a receiving apparatus that is applicable to orthogonal frequency division multiplexing (Orthogonal frequency Division Multiplexing, OFDM for short), and the receiving apparatus may use an apparatus structure shown in any apparatus embodiment in FIG. 1, FIG. 2, or FIG. 4.

Step 202: Determine a channel type according to a result of comparison between the measured delay spread value and a preset delay spread value.

A specific implementation method may be: it is determined whether the measured delay spread value is less than a first preset delay spread value; and if the measured delay spread value is less than the first preset delay spread value, the channel type is an extended pedestrian model A EPA; or if the measured delay spread value is greater than or equal to the first preset delay spread value, and the measured delay spread value is less than the second preset delay spread value, the channel type is an extended vehicular model A EVA; or if the measured delay spread value is greater than or equal to the first preset delay spread value, and the measured delay spread value is greater than or equal to the second preset delay spread value, the channel type is an extended typical urban model ETU.

Step 203: Select a weighting coefficient that matches the channel type from a preset channel parameter configuration table according to the channel type, where the weighting coefficient includes a time-domain window length, a time-domain windowing coefficient, a maximum quantity of interference cancellation subcarriers, and an interference estimation weighting coefficient.

Step 204: Perform time-domain windowing processing on the time-domain signal according to the time-domain window length and the time-domain windowing coefficient, where the time-domain windowing processing includes windowing processing and cyclic prefix CP combination processing.

Step 205: Perform FFT on the signal on which the time-domain windowing processing has been performed, to obtain a frequency-domain signal.

Step 206: Determine a center frequency location of narrowband interference.

The receiving apparatus may determine the center frequency location according to control signaling, or may determine the center frequency location by traversing all subcarriers corresponding to the frequency-domain signal.

Step 207: Calculate narrowband interference power according to the center frequency location and the frequency-domain signal.

A specific implementation method may be: power of frequency-domain signals that are corresponding to Q subcarriers is accumulated by using the center frequency location as a center, to obtain the narrowband interference power, where Q is determined by narrowband interference bandwidth and a subcarrier interval, and Q is a natural number.

Step 208: Determine, according to the maximum quantity of interference cancellation subcarriers and the narrowband interference power, a quantity of subcarriers on which interference needs to be canceled.

A specific implementation method may be: a preset subcarrier quantity mapping table is searched for a power level that matches the narrowband interference power, and the quantity of subcarriers on which interference needs to be canceled is determined according to the power level and the maximum quantity of interference cancellation subcarriers.

Step 209: Calculate, according to the weighting coefficient and the quantity of subcarriers on which interference needs to be canceled, interference on the subcarrier on which interference needs to be canceled.

A specific implementation method may be: M subcarriers are selected as observation samples by using the center frequency location as a center, and the interference on the subcarrier on which interference needs to be canceled is calculated according to the observation samples, the weighting coefficient, and the quantity of subcarriers on which interference needs to be canceled.

Step 210: Cancel the interference according to the interference on the subcarrier on which interference needs to be canceled and the frequency-domain signal that is corresponding to the subcarrier on which interference needs to be canceled, so as to cancel the narrowband interference of the time-domain signal.

In this embodiment, narrowband interference intensity is detected in real time, and a related weighting coefficient for interference cancellation is selected according to the narrowband interference intensity, so that time-domain windowing processing and frequency-domain interference cancellation processing are performed on a received signal, to resolve a problem that an existing narrowband interference method is relatively complex, less flexible, and difficult to implement.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A receiving apparatus, comprising:
a processor; and
memory comprising instructions that, when executed by the processor, cause the apparatus to:
  measure a delay spread of a multipath channel passed by a received time-domain signal, and determine a channel type of the multipath channel according to a measurement result,
  select a weighting coefficient according to the channel type,
  select the weighting coefficient that matches the channel type from a preset channel parameter configuration table according to the channel type, wherein the weighting coefficient comprises a time-domain window length, a time-domain windowing coefficient, a maximum quantity of subcarriers on which interference needs to be canceled, and an interference estimation weighting coefficient,
  perform time-domain windowing processing on the time-domain signal according to the weighting coefficient, and
  perform, according to the weighting coefficient, frequency-domain interference cancellation processing on a signal that is output after the time-domain windowing processing, so as to cancel narrowband interference of the time-domain signal.

2. The apparatus according to claim 1, wherein the instructions, when executed by the processor, cause the apparatus to:
  measure the delay spread of the multipath channel passed by the time-domain signal, to obtain a measured delay spread value; and
  determine the channel type according to a result of a comparison between the measured delay spread value and a preset delay spread value.

3. The apparatus according to claim 2, wherein the instructions, when executed by the processor, cause the apparatus to:
  determine whether the measured delay spread value is less than a first preset delay spread value; and
  when the measured delay spread value is less than the first preset delay spread value, the channel type is an extended pedestrian model A (EPA); or
  when the measured delay spread value is greater than or equal to the first preset delay spread value, and the measured delay spread value is less than a second preset delay spread value, the channel type is an extended vehicular model A (EVA); or
  when the measured delay spread value is greater than or equal to the first preset delay spread value, and the measured delay spread value is greater than or equal to the second preset delay spread value, the channel type is an extended typical urban model (ETU).

4. The apparatus according to claim 1, wherein the instructions, when executed by the processor, cause the apparatus to:
  perform the time-domain windowing processing on the time-domain signal according to the time-domain window length and the time-domain windowing coefficient, wherein the time-domain windowing processing comprises windowing processing and cyclic prefix CP combination processing.

5. The apparatus according to claim 1, wherein the instructions, when executed by the processor, cause the apparatus to:
  perform fast Fourier transformation (FFT) on the signal on which the time-domain windowing processing has been performed, to obtain a frequency-domain signal.

6. The apparatus according to claim 5, wherein the instructions, when executed by the processor, cause the apparatus to:
  determine a center frequency location of the narrowband interference, and calculate narrowband interference power according to the center frequency location and the frequency-domain signal;
  determine, according to the maximum quantity of interference cancellation subcarriers and the narrowband interference power, a quantity of subcarriers on which interference needs to be canceled;

calculate, according to the weighting coefficient and the quantity of subcarriers on which interference needs to be canceled, interference on the subcarrier on which interference needs to be canceled; and cancel the interference according to the interference on the subcarrier on which interference needs to be canceled and a frequency-domain signal that is corresponding to the subcarrier on which interference needs to be canceled, so as to cancel the narrowband interference of the time-domain signal.

7. The apparatus according to claim 6, wherein the instructions, when executed by the processor, cause the apparatus to:

accumulate, by using the center frequency location as a center, power of frequency-domain signals that are corresponding to Q subcarriers, to obtain the narrowband interference power, wherein Q is determined by narrowband interference bandwidth and a subcarrier interval, and Q is a natural number.

8. The apparatus according to claim 6, wherein the instructions, when executed by the processor, cause the apparatus to:

search a preset subcarrier quantity mapping table for a power level that matches the narrowband interference power, and determine, according to the power level and the maximum quantity of interference cancellation subcarriers, the quantity of subcarriers on which interference needs to be canceled.

9. The apparatus according to claim 6, wherein the instructions, when executed by the processor, cause the apparatus to:

select M subcarriers as observation samples by using the center frequency location as a center, and calculate, according to the observation samples, the weighting coefficient, the quantity of subcarriers on which interference needs to be canceled, and the interference on the subcarrier on which interference needs to be canceled, wherein M is a natural number.

10. The apparatus according to claim 6, wherein the instructions, when executed by the processor, cause the apparatus to:

determine the center frequency location according to control signaling.

11. The apparatus according to claim 6, wherein the instructions, when executed by the processor, cause the apparatus to:

determine the center frequency location by traversing subcarriers corresponding to the frequency-domain signal.

12. An adaptive narrowband interference suppression method, comprising:

measuring a delay spread of a multipath channel passed by a received time-domain signal, and determining a channel type of the multipath channel according to a measurement result;

selecting a weighting coefficient that matches the channel type from a preset channel parameter configuration table according to the channel type, wherein the weighting coefficient comprises a time-domain window length, a time-domain windowing coefficient, a maximum quantity of interference cancellation subcarriers, and an interference estimation weighting coefficient;

performing time-domain windowing processing on the time-domain signal according to the weighting coefficient; and performing, according to the weighting coefficient, frequency-domain interference cancellation processing on the signal that is output after the time-domain windowing processing, so as to cancel narrowband interference of the time-domain signal.

13. The method according to claim 12, wherein measuring a delay spread of a multipath channel passed by a received time-domain signal, and determining a channel type according to a measurement result comprises:

measuring the delay spread of the multipath channel passed by the time-domain signal, to obtain a measured delay spread value; and determining the channel type according to a result of comparison between the measured delay spread value and a preset delay spread value.

14. The method according to claim 13, wherein determining the channel type according to a result of comparison between the measured delay spread value and a preset delay spread value comprises:

determining whether the measured delay spread value is less than a first preset delay spread value; and when the measured delay spread value is less than the first preset delay spread value, the channel type is an extended pedestrian model A (EPA); or when the measured delay spread value is greater than or equal to the first preset delay spread value, and the measured delay spread value is less than the second preset delay spread value, the channel type is an extended vehicular model A (EVA); or when the measured delay spread value is greater than or equal to the first preset delay spread value, and the measured delay spread value is greater than or equal to the second preset delay spread value, the channel type is an extended typical urban model (ETU).

15. The method according to claim 12, wherein performing time-domain windowing processing on the time-domain signal according to the weighting coefficient comprises:

performing the time-domain windowing processing on the time-domain signal according to the time-domain window length and the time-domain windowing coefficient, wherein the time-domain windowing processing comprises windowing processing and cyclic prefix CP combination processing.

16. The method according to claim 12, before performing, according to the weighting coefficient, frequency-domain interference cancellation processing on the signal that is output after the time-domain windowing processing, so as to cancel narrowband interference of the time-domain signal, further comprising:

performing faster Fourier transformation (FFT) on the signal on which the time-domain windowing processing has been performed, to obtain a frequency-domain signal.

17. The method according to claim 16, wherein performing, according to the weighting coefficient, frequency-domain interference cancellation processing on the signal that is output after the time-domain windowing processing, so as to cancel narrowband interference of the time-domain signal comprises:

determining a center frequency location of the narrowband interference;

calculating narrowband interference power according to the center frequency location and the frequency-domain signal;

determining, according to the maximum quantity of interference cancellation subcarriers and the narrowband interference power, a quantity of subcarriers on which interference needs to be canceled;

calculating, according to the weighting coefficient and the quantity of subcarriers on which interference needs to be canceled, interference on the subcarrier on which interference needs to be canceled; and canceling the interference according to the interference on the subcarrier on which interference needs to be canceled and the frequency-domain signal that is corresponding to the subcarrier on which interference needs to be canceled, so as to cancel the narrowband interference of the time-domain signal.

18. The method according to claim 17, wherein calculating narrowband interference power according to the center frequency location and the frequency-domain signal comprises:

accumulating, by using the center frequency location as a center, power of frequency-domain signals that are corresponding to Q subcarriers, to obtain the narrowband interference power, wherein Q is determined by narrowband interference bandwidth and a subcarrier interval, and Q is a natural number.

* * * * *